United States Patent [19]
Benezech

[11] 4,234,905
[45] Nov. 18, 1980

[54] ELECTRICAL CONDENSER

[75] Inventor: Jacques Benezech, Le Vesinet, France

[73] Assignee: NOVI P.B. Societe Anonyme, Pantin, France

[21] Appl. No.: 888,786

[22] Filed: Mar. 21, 1978

[30] Foreign Application Priority Data

Mar. 22, 1977 [FR] France .................................. 77 08465
Feb. 10, 1978 [FR] France .................................. 78 03751

[51] Int. Cl.³ .............................................. H01G 1/14
[52] U.S. Cl. ...................................... 361/307; 361/306
[58] Field of Search ................................. 361/307, 306

[56] References Cited

U.S. PATENT DOCUMENTS

| | | | |
|---|---|---|---|
| 1,694,927 | 12/1928 | Rice | 361/307 |
| 2,553,616 | 5/1951 | Walls . | |
| 2,648,030 | 8/1953 | Kiekaefer | 361/306 X |
| 2,958,023 | 10/1960 | Edwards . | |
| 3,184,661 | 5/1965 | Wezler | 361/307 |
| 3,391,313 | 7/1968 | Hevey . | |
| 3,537,173 | 11/1970 | Sparrow . | |
| 3,691,436 | 9/1972 | Maijers | 361/306 |
| 3,986,084 | 10/1976 | Carter | 361/306 X |

FOREIGN PATENT DOCUMENTS

| | | | |
|---|---|---|---|
| 306607 | 8/1916 | Fed. Rep. of Germany . | |
| 1227360 | 3/1960 | France | 361/306 |
| 2110871 | 5/1972 | France . | |
| 628275 | 8/1949 | United Kingdom | 361/307 |

Primary Examiner—E. A. Goldberg
Attorney, Agent, or Firm—Karl F. Ross

[57] ABSTRACT

Two relatively narrow conductive strips are wound together with a pair of relatively wide insulating strips, with the one conductive strip offset laterally from the other. The generally cylindrical body produced in this manner is hardened and its ends are formed with diametrally opening holes beyond the region at which the two conductive strips overlap each other. Terminals are then force-fitted into these holes to form good electrical contact with the respective strips and the entire assembly is then potted in synthetic-resin material to form a heavy-duty and rugged condenser.

8 Claims, 22 Drawing Figures

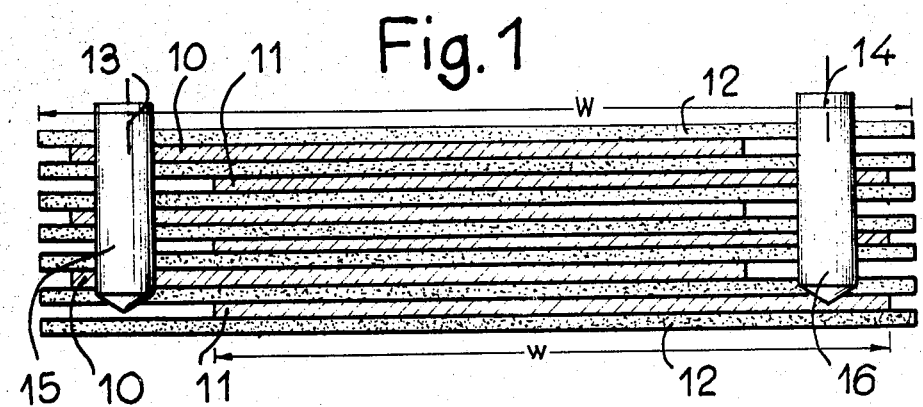
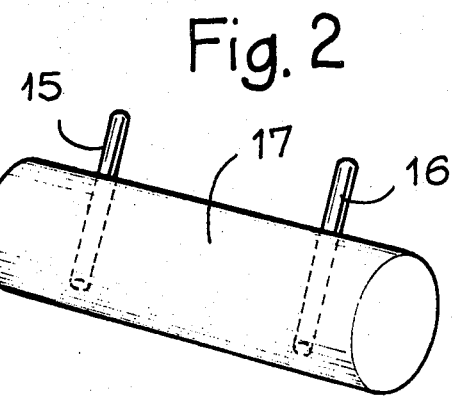
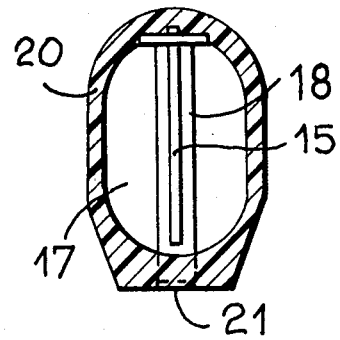
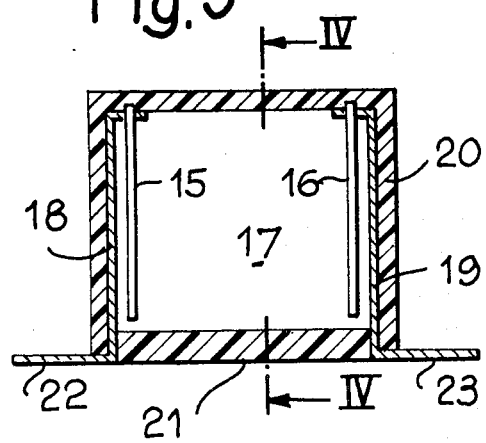

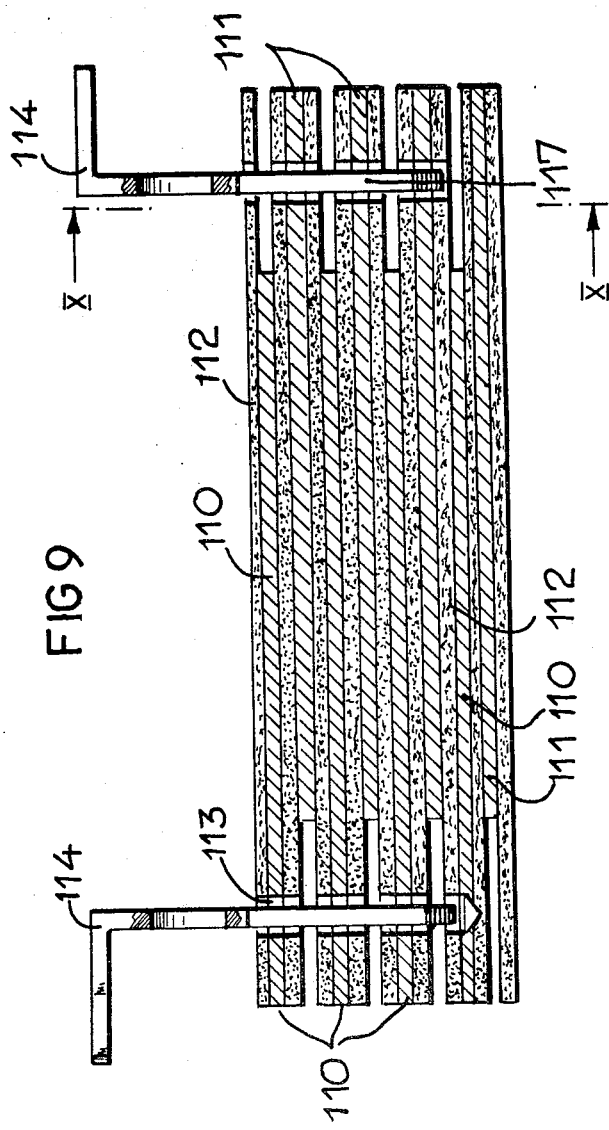
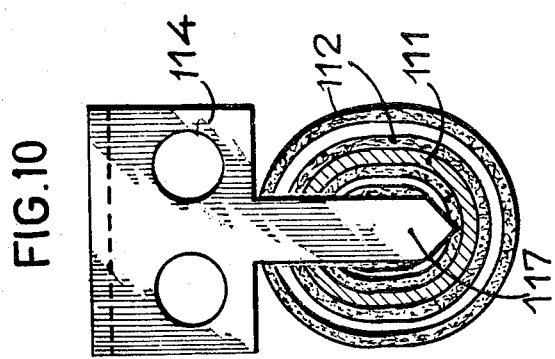

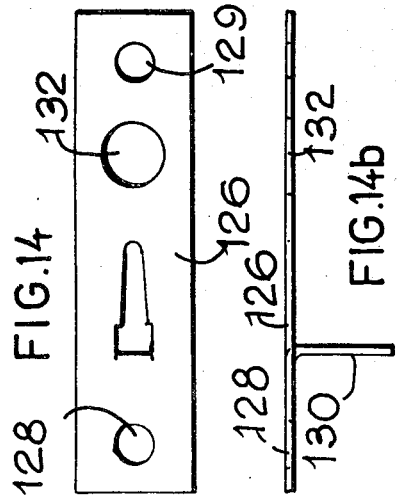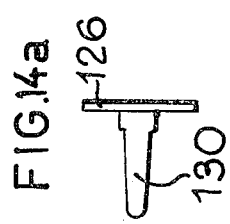

ELECTRICAL CONDENSER

FIELD OF THE INVENTION

The present invention relates to an electrical condenser. More particularly, this invention concerns a heavy-duty condenser usable in a motor-vehicle system.

An electrical condenser basically comprises a pair of juxtaposed electrical elements separated by a thin space or layer of insulating material so that electrical energy can only pass between the plates electrostatically. In normal usage such a condenser is made by rolling up two strips of conductive material with two strips of insulating or dielectric material. In this manner a relatively large area can be very closely juxtaposed with another relatively large surface area on both sides in a very small volumetric space. A terminal or lead must be connected to each of the conductive strips to be able to wire in such a condenser.

In the simplest known system each lead or terminal is simply connected to the respective foil constituting the respective conductive strip before winding-up of the assembly. Such a procedure has the disadvantage that the resistance of the strip and the inherent selfinductance thereof will affect the associated circuitry.

To this end a common procedure is simply to use relatively thin strips of dielectric material and relatively wide but laterally offset strips of conductive material. The dielectric material separates the layers of conductive material at the region of overlap so that a conductor can be connected to each of these strips at a plurality of the turns thereof at each end. Such a conductor is normally soldered to the strip which is normally of tin.

This last-mentioned arrangement is relatively simple and advantageous. However in recent times greater use is being made of thin aluminum foil as a conductive strip. To fasten a lead thereto it is necessary to use zinc or tin with a flame-type soldering. Such a procedure is relatively expensive.

It has also been suggested simply to use thermoplastic insulating material which is substantially wider than the two strips of conductive material. Furthermore the outer ends of the two strips of conductive material are angularly offset from one another. A lead is connected to this arrangement by heating it, as for example by passing a high electric current through it, and this hot wire is pressed radially against the condenser body adjacent each of the conductive strips. Such a wire will therefore melt through the thermoplastic and form on electrical contact with the strips, so that when the casing material subsequently hardens this wire will be held firmly in place. Such a system has the disadvantage that there is some resistance at the junction between the wire and the respective conductive strips and that the condenser thus produced is not physically strong. Furthermore when such a condenser is used in a wet environment as for example in a motor-vehicle ingition system, leakage becomes a severe problem so that the condenser fails prematurely.

OBJECTS OF THE INVENTION

It is therefore an object of the present invention to provide an improved condenser.

Another object is to provide an improved method of making such a condenser.

Yet another object is the provision of a condenser which can be made at relatively low cost and that will be extremely robust and will have a long service life.

A further object is to provide a condenser usable in the magnetos described in the copending and commonly owned applications Ser. No. 883,579 and 883,580 both filed Mar. 6, 1978.

SUMMARY OF THE INVENTION

These objects are attained according to the instant invention in a condenser of the above-described general type wherein the first and second conductive strips are wound together with insulating strips to form an elongated condenser body having longitudinally opposite first and second ends provided with respective first and second terminals connected to the first and second conductor strips. According to the invention the conductive strips are both substantially narrower than the insulating strips and are laterally offset from each other with the first conductive strip terminating short of the second end and the second strip terminating short of the first end. The condenser body is formed at these ends with respective first and second transversely extending blind socket holes with the first conductive strip being exposed in the first hole and the second conductive strip being exposed in the second hole. The terminals have respective first and second connection parts which are tightly received in the first and second holes in good electrical contact with the first and second conductive strips. According to this invention the entire assembly of conductor body and terminals is potted with an insulating and watertight casing that completely surrounds the condenser body and through which the above-mentioned terminals project.

The condenser according to this invention is therefore formed by winding the first and second narrow conductive strips with at least one relatively wide insulating strip while a laterally offseting the conductive strips to each other. After such formation the first and second holes are formed and the first and second terminals are then force-fitted into these holes. The wound-up condensor body is preferably hardened into a machinable workpiece prior to formation of the first and second holes. This is effected when the insulating strip is paper by drying the wound-up strips in a vaccuum and thereafter impregnating the assembly with a resin. When a synthetic-resin strip is used as the insulating material it is possible simply to autoclave the finished wound-up body to harden it into a machinable mass.

The condensor according to this invention is therefore a very compact and almost totally watertight unit. The terminals are rigidly mounted in the condenser body and each terminal is in contact with a plurality of the turns of the respective conductive strip, so that there is virtually no resistance at the junction between each terminal and the respective strip and similarly any selfinductance or other disadvantageous electrical effect is almost completely eliminated. Production costs for the condenser are similarly very low, since the force-fitting of the terminal into the hole of the condensor body is an extremely simple and inexpensive operation, replacing the normally more expensive methods of securing the terminals to the conductive strips.

The terminals according to this invention may be of two-piece construction, constituted by a pin force-fitted into the respective hole and a flat connector tab connected thereto and projecting through the casing of the condensor, or may be of simple one-piece construction.

In both cases the terminal has an inner part which is embedded in the respective hole and an outer part which extends through the casing in watertight fashion. Indeed in accordance with a particular advantage of this invention one of the terminals is formed as a ground strip and projects longitudinally from each end of the condenser, and has at each projecting end a throughgoing hole suitable for attachment of the condenser to a magneto or the like as described in the above-cited copending applications whose entire discosure are herewith incorporated by reference. The other terminal may pass transversely out of the condenser body through a hole in the ground lug. This system allows very easy mounting and grounding of the condenser in a magneto stator as described in my copending applications.

BRIEF DESCRIPTION OF THE DRAWING

FIG. 1 is a longitudinal section through a condenser according to this invention at an intermediate stage of manufacture;

FIG. 2 is a perspective view of a partially assembled condenser of FIG. 1;

FIG. 3 is a shortened longitudinal section through a finished condenser incorporating the unit of FIGS. 1 and 2;

FIG. 4 is a section taken along line IV—IV of FIG. 3;

FIG. 9 is a view similar to FIG. 1 of a fourth condenser according to the instant invention;

FIG. 10 is a section taken along line X—X of FIG. 9;

FIG. 14 is a plan view of a connector terminal of a sixth condenser according to this invention;

FIGS. 14a and 14b are end and side views, respectively, of the terminal of FIG. 14;

FIG. 15 is a plan view of the other terminal of the sixth condenser according to this invention;

FIGS. 15a and 15b are side and a large-scale sectional views of the terminal of FIG. 15;

FIGS. 16 and 17 are plan and side views, respectively, of the sixth condenser according to this invention; and FIG. 18 is a section taken along line XVIII—XVIII of FIG. 17.

SPECIFIC DESCRIPTION

Figure 6:
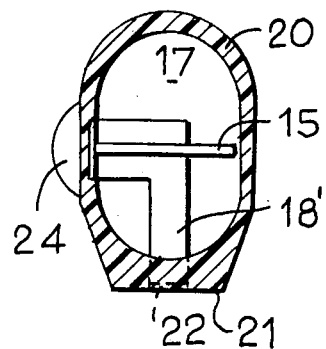
FIG. 6 is a section taken along line VI—VI of FIG. 5.

As shown in FIGS. 1-4 a condenser according to this invention is basically formed of a plurality of turns of a first conductive strip 10 separated from the turns of a second conductor strip 11 by layers of an insulating strip 12. The strips 10 and 11 are of a relatively narrow width w and are laterally offset to each other so that they only overlap at a central region. These strips 10 and 11 are formed of aluminum having a thickness of between 5 microns and 10 microns. The insulating strip 12 is formed of dielectric paper and has a width W which is substantially larger than the width w and even larger than the width w plus the extent of transverse overlap of the two strips 10 and 11 by approximately 2 mm, so that a overlap of 1.0 mm is present at each end of the wound-up assembly. Two insulating strips 12 may be wound up with the strips 10 and 11, or a single insulating strip 12 may be folded over at the end of one of the strips 10 or 11 so that it has a section to each side of the strip it is folded over. In either case it is necessary that a layer of the strip 12 be provided to each side of each of the strips 11.

The cylindrical body constituted by the wound-up strips 10-12 is dried in a vacuum, then injected under pressure with a resin-containing product such as varnish. The thus injected body is then heated first in a vacuum then under pressure so as to form a very hard and compact condenser body that will be completely penetrated by the resin which transforms the assembly into a machinable mass and increases the dielectric effect of the paper layers 12 and which also covers the entire exterior of the cylindrical body 17 thus formed.

It is thereafter possible to flatten the body 17 somewhat so that it is of generally eliptical section. Thereafter it is formed at its ends with diametral blind bores 13 and 14 extending as shown in FIG. 4 almost entirely through the body at the major axis thereof. Pins 15 and 16 are then forcibly driven into the holes 13 and 14 until they bottom therein and only project radially therefrom by a distance of between 2 mn and 3 mn. The pin 15 will only be in electrical contact with the conductor strips 10 and the pin 14 only with the conductive strip 11.

Subsequently generally Z-shaped terminal strips 18 and 19 have their inner ends fitted over and soldered to the pins 15 and 16 and have their outer ends 22 and 23 aligned in a common plane at one side of the body 17. The entire body 17 is then incapsulated with a synthetic resin to form a casing 20 having a flat side 21 coplanar with the outer ends 22 and 23.

According to this invention the pins 15 and 16 are of copper or brass and have a diameter approximately 0.5 mn greater than the diameters of the holes 13 and 14 into which they are fitted so that they form an excellent electrical contact with the respective aluminum strips 10 and 11. The casing 20 may be formed of polypropylene or other synthetic-resin having good mechanical and dielectric properties, and is injection-molded right over the body 17 to form an extremely durable unit. The condenser thus formed is readily usable in electronic, telecommunication, or similar equipment, in particular may be employed as the condenser shown at 16 in FIG. 1 of the above-cited copending application Ser. No. 883,580.

Figure 5:
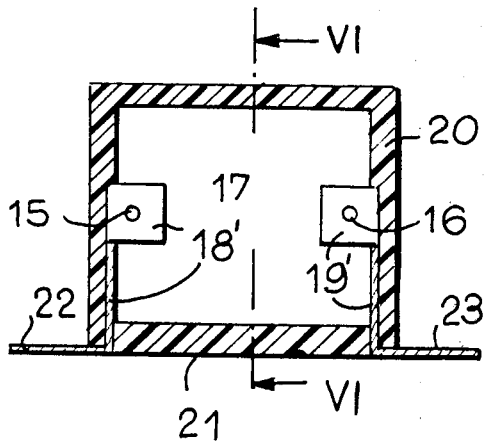
FIG. 5 is a view similar to FIG. 3 illustrating a second condenser according to this invention.

The condenser of FIGS. 5 and 6 is identical to that of FIGS. 1-4 except that here the pins 15 and 16 extend parallel to the plane of the face 21 and along the minor axis of the elipse the body 17 forms in section. To this end the terminals 18' and 19' must have their inner ends bent over to lie at right angles to their outer ends 22 and 23. In addition a bump 24 is formed on a casing 20 to aid in mounting the condenser.

Figure 8:
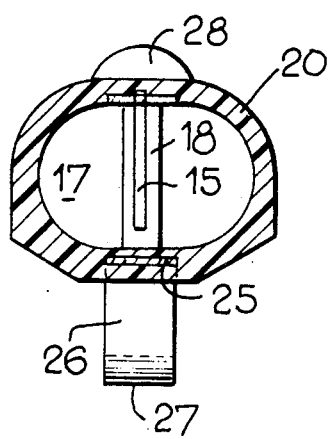
FIG. 8 is a section taken along line VIII—VIII of FIG. 7.
Figure 7:
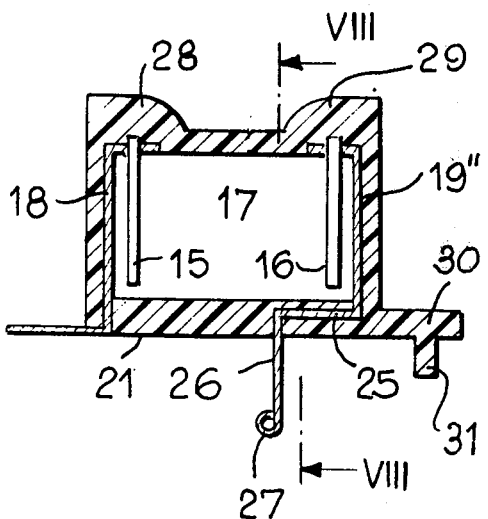
FIG. 7 is a view similar to FIG. 3 illustrating a third condenser according to this invention.
Figure 11:
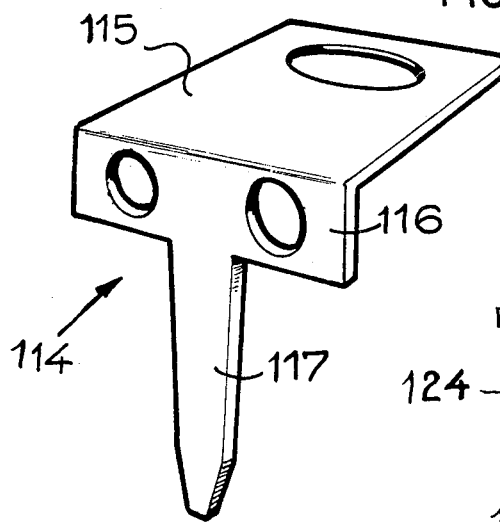
FIG. 11 is a perspective view of one of the terminals of the fourth condenser of FIGS. 9 and 10.

The arrangement of FIGS. 7 and 8 is identical to that of FIGS. 1-4 except that here the terminal 19" does not have an outwardly extending end 23, but instead has an inwardly directed portion 25 and a radially directed portion 26 terminating at an eye 27. Bumps 28 and 29 are formed at the two ends of the condenser and at its end opposite the terminal 18 the casing 20 is formed with an extension 30 having a downwardly projecting tab or lug 31 useful in mounting the condenser.

In the arrangement of FIGS. 1–11 a generally cylindrical body is formed by a pair of conductive strips 110 and 111 separated by insulating strips 112. In this arrangement the strip 112 is formed of a dielectric synthetic resin such as polystyrene, polypropylene, polyester, polycarbonate, or similar synthetic-resin material. As such material is normally nonporous and of extremely uniform thickness it is possible to use it without a subsequent impregnation of the body by a resin. Thus after winding up the body is merely necessary to heat it in an autoclave for between 1 and 4 hours at a temperature between 100° C. and 200° C. so as to cause a limited longitudinal shrinking of the strip 112 around the aluminum strips 110 and 11 and making a very compact and hard body.

Thereafter holes 113 are formed at each end and tabs 114 of L-shaped each having a relatively large outer leg 115, relative small inner leg 116, and a tapered point 117 is fitted to each of these holes 113. The edges of the tapered portion or point 117 of each of these terminals 114 cut into the edges of the pierced holes 113 to form an excellent electrical contact with the respective strips 110 and 111. In fact any oxide coating on these strips 110 and 111 will be scraped off during mounting of the brass terminals 114 therein to form an excellent electrical contact.

Figure 12:
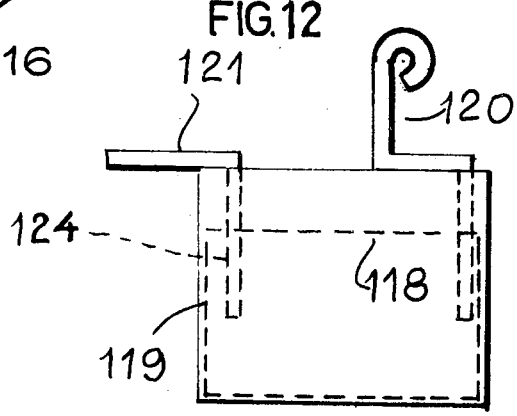
FIG. 12 is a side view of a fifth condenser according to this invention.
Figure 13:
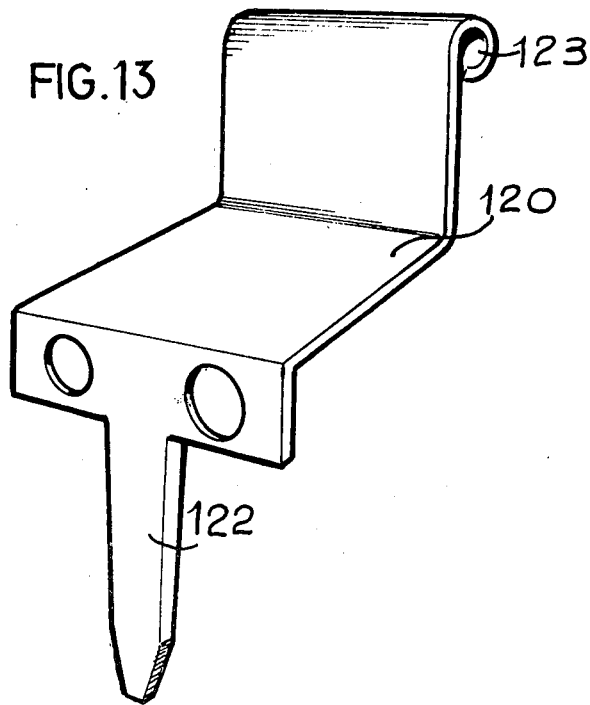
FIG. 13 is a perspective view of one of the terminals of the fifth condenser of FIG. 12.

It is possible as shown in FIGS. 12 and 13 to provide a condenser body 118 formed as described above with reference to FIGS. 9–11 with a casing 119 from which extends a pair of terminals 121 and 120. Terminal 121 has a point 124 identical to the point 114, and the terminal 120 as best shown in FIG. 13 has a point 112 identical to point 116, but has another end bent up and forming an eye 123 suitable for connection of a wire to the condenser. This eye 123 lies intermediate the ends of the condensor as in FIG. 7.

Finally FIGS. 14–18 show yet another condenser basically having a body 125 provided with terminals 126 and 127 and having a casing 131.

The terminals 126 is formed as a flat ground lug or plate that extends longitudinally along the body 125 and projects from both ends of the finished condenser and having holes 128 and 129 at the exposed ends. Between its ends the ground terminal or plate 126 is provided with an upstanding point 131 that is inserted into a hole such as is shown at 113 in FIG. 9. The other terminal 127 passes through a hole 132 formed in the plate 126 to avoid electrical contact with this plate 126 and has an inner end formed with a point 127a. The outer end of the terminal 127 can be formed as shown in FIG. 17 with an eye 127b, or as shown in FIG. 15 with a notch 127c suitable for attachment of a wire. In this latter arrangement bumps 127d may be formed on the terminal 127 by pressing-out from one side of the strip. These bumps 127d allows standard female connector lugs to be slipped over the terminal 127 for connecting the live side of the condenser 17. Obviously the plate 126 serves not only to mount the condenser rigidly on a support, but also serves for grounding of this condenser to the support.

The condenser according to this invention therefore can be produced at relatively low cost. At the same time it is an extremely rigid unit suitable for use in even the most antagonist environments, as for instance in the ignition system of an automotive-vehicle engine. The electrical connection between the terminals and the respective conductive strips is extremely good and can be produced at extremely low cost.

I claim:

1. In a condenser wherein first and second conductive strips are wound together with insulating strips to form an elongated condenser body having longitudinally opposite first and second ends provided with respective first and second terminals connected to the first and second conductive strips, the improvement wherein:

a mass of material permeates said body and bonds said strips together into a rigid block;

said conductive strips are both substantially narrower than said insulating strips and are longitudinally offset from each other with said first strip terminating short of said second end and said second strip terminating short of said first end;

said body is formed at said ends with respective first and second transversely extending socket holes, said first conductive strips being exposed in said first hole and said second conductive strip being exposed in said second hole;

said terminals have respective first and second connection parts respectively tightly received in said first and second holes in good electrical contact with said first and second conductive strips; and a hard casing of insulating material tightly surrounds said condenser body, said first terminal being a ground lug extending longitudinally along said body, imbedded in said casing, exposed at both ends of said body, and having a throughgoing hole through which said second terminal extends.

2. The condenser defined in claim 1 wherein said ground lug and said first terminal are unitary.

3. The condenser defined in claim 1 wherein said insulating strip is of paper and said terminal parts are metallic pins, said holes being blind and opening generally in the same direction.

4. The condenser defined in claim 1 wherein each of said holes extends transversely most of the way through said body.

5. The condenser defined in claim 1 wherein said insulating strip is at most 5 mm wider than said conductive strips.

6. The condenser defined in claim 3 wherein said casing has a flat face from which said terminals project.

7. The condenser defined in claim 1 wherein said insulating strip is of synthetic-resin material.

8. The condenser defined in claim 7 wherein said material is polystyrene, polypropylene, polyester, or polycarbonate.

* * * * *